(12) United States Patent
Neukam (10) Patent No.: US 11,932,163 B2
(45) Date of Patent: Mar. 19, 2024

(54) IMAGE SEQUENCE WITH REFERENCE IMAGE FOR UNIFORM LIGHTING OF ROUTE FOR CONTROLLING PIXEL LAMP OF MOTOR VEHICLE ARRANGED ON ROUTE

(71) Applicant: AUDI AG, Ingolstadt (DE)

(72) Inventor: Johannes Neukam, Pegnitz (DE)

(73) Assignee: AUDI AG, Ingolstadt (DE)

( * ) Notice: Subject to any disclaimer, the term of this patent is extended or adjusted under 35 U.S.C. 154(b) by 1078 days.

(21) Appl. No.: 16/628,230

(22) PCT Filed: Jul. 4, 2018

(86) PCT No.: PCT/EP2018/068106
§ 371 (c)(1),
(2) Date: Jan. 2, 2020

(87) PCT Pub. No.: WO2019/008045
PCT Pub. Date: Jan. 10, 2019

(65) Prior Publication Data
US 2021/0162913 A1    Jun. 3, 2021

(30) Foreign Application Priority Data

Jul. 5, 2017   (DE) .................... 10 2017 211 430.4

(51) Int. Cl.
*G06V 10/141*   (2022.01)
*B60Q 1/08*    (2006.01)
(Continued)

(52) U.S. Cl.
CPC .............. *B60Q 1/14* (2013.01); *B60Q 1/085* (2013.01); *B60Q 1/1423* (2013.01);
(Continued)

(58) Field of Classification Search
CPC ........ B60Q 1/14; B60Q 1/085; B60Q 1/1423; B60Q 2300/00; G06V 10/141; G06V 20/56; G06V 20/588
See application file for complete search history.

(56) References Cited

U.S. PATENT DOCUMENTS 11,682,752 B2 * 6/2023 Lopez .................. H01L 33/005
345/82
2014/0309789 A1 * 10/2014 Ricci ...................... G06F 16/25
700/276
(Continued)

FOREIGN PATENT DOCUMENTS

CN   102887108 A   1/2013
DE   102008039091 A1   5/2009
(Continued)

OTHER PUBLICATIONS

International Search Report for PCT/EP2018/068106, dated May 9, 2019.
(Continued)

*Primary Examiner* — Ming Y Hon
(74) *Attorney, Agent, or Firm* — STAAS & HALSEY LLP (57) ABSTRACT

A pixel lamp of a motor vehicle emanates light based on a control signal that represents an image sequence. A respective individual image from the image sequence corresponds to a respective light distribution currently needing to be provided by the pixel lamp. The route is captured by use of a vehicle camera, and the camera data are evaluated and the control signal is provided based on an ascertained advisory route accoutrement. The image sequence is provided at an image sequence frequency of greater than 24 Hz and includes at least one reference image for uniformly lighting the route, the vehicle camera is synchronized to the reference image, the advisory route accoutrement and informa- (Continued)

tion data associated with the advisory route accoutrement are ascertained from the provided camera data, the associated information data are compared with data of a database, and the control signal is ascertained based on the comparison.

15 Claims, 9 Drawing Sheets

(51) Int. Cl.
 *B60Q 1/14* (2006.01)
 *G06V 20/56* (2022.01)

(52) U.S. Cl.
 CPC ............ *G06V 10/141* (2022.01); *G06V 20/56* (2022.01); *B60Q 2300/00* (2013.01); *G06V 20/588* (2022.01)

(56) References Cited

U.S. PATENT DOCUMENTS

| | | | |
|---|---|---|---|
| 2016/0371983 A1 | 12/2016 | Ronning et al. | |
| 2017/0301318 A1* | 10/2017 | Nishimura | G09G 5/38 |
| 2018/0186278 A1* | 7/2018 | Song | B60Q 1/143 |
| 2019/0279007 A1* | 9/2019 | Zinner | G08G 1/09623 |

FOREIGN PATENT DOCUMENTS

| | | |
|---|---|---|
| DE | 102010029149 B4 | 4/2012 |
| DE | 102011081396 A1 | 2/2013 |
| DE | 102012003158 A1 | 8/2013 |
| DE | 102014000935 A1 | 7/2015 |
| DE | 102015207543 A1 | 10/2016 |
| DE | 102017211430.4 | 7/2017 |
| WO | PCT/EP2018/068106 | 7/2018 |

OTHER PUBLICATIONS

German OA for German Application No. 10 2017 211 430.4 dated May 23, 2018.
Tamburo, Robert et al. "DMDs for smart headlights"; *Visual Communications and Image Processing*; Jan. 20, 2004-Jan. 20, 2004; San Jose, vol. 8979, Mar. 7, 2014, pp. 89790F1-89790F4 DOI: 10.1117/12.2053788 ISBN: 978-1-62841-730-2. XP060034751.
Translation of International Preliminary Report on Patentability/ Written Opinion of the International Searching Authority dated Jan. 16, 2020, from International Application No. PCT/EP2018/068106, 11 pages.
Robert Tamburo et al., "DMDs for smart headlights", Proc. SPIE 8979, Emerging Digital Micromirror Device Based Systems and Applications VI, San Francisco, CA, Mar. 7, 2014*.
Chinese Examination Report issued in parallel Chinese Application No. 201880044831.5 dated Mar. 8, 2023.
European Office Action dated May 25, 2022 in related European Patent Application No. 18740749.9 (13 pages).

* cited by examiner

IMAGE SEQUENCE WITH REFERENCE IMAGE FOR UNIFORM LIGHTING OF ROUTE FOR CONTROLLING PIXEL LAMP OF MOTOR VEHICLE ARRANGED ON ROUTE

CROSS REFERENCE TO RELATED APPLICATIONS

This application is a U.S. national stage of International Application No. PCT/EP2018/068106 filed on Jul. 4, 2018. The International Application claims the priority benefit of German Application No. 10 2017 211 430.4 filed on Jul. 5, 2017. Both the International Application and the German Application are incorporated by reference herein in their entirety.

BACKGROUND

Described herein is a method for controlling a pixel lamp of a motor vehicle arranged on a route, in which the pixel lamp emanates light on the basis of a control signal that represents an image sequence, in order to light at least part of the route, wherein a respective individual image from the image sequence corresponds to a respective light distribution currently needing to be provided by the pixel lamp, the lit route is captured by use of a vehicle camera that provides corresponding camera data, and the camera data are evaluated in order to ascertain at least one advisory route accoutrement and to provide the control signal for controlling the pixel lamp on the basis of the ascertained advisory route accoutrement. Also described herein is a control device for controlling a pixel lamp of a motor vehicle arranged on a route, having a control signal unit designed to provide a control signal, which represents an image sequence, for the pixel lamp for lighting the route of the motor vehicle, so that the pixel lamp emanates light in order to light at least part of the route, wherein a respective individual image from the image sequence corresponds to a respective light distribution currently needing to be provided by the pixel lamp, a receiving unit for receiving camera data of a vehicle camera that captures the lit route and provides the camera data, and an evaluation unit, which is connected to the control signal unit and the receiving unit, for evaluating the camera data in order to ascertain at least one advisory route accoutrement so that the control signal unit provides the control signal on the basis of the ascertained advisory route accoutrement. Finally, also described herein is a motor vehicle having a vehicle camera, a pixel lamp and a control device for controlling the pixel lamp.

Methods for lighting the vehicle surroundings of the motor vehicle, control devices for controlling the pixel lamp of the motor vehicle and also motor vehicles of the type in question are known extensively in the related art. Motor vehicles have lamps, for example motor vehicle lamps, by use of which the vehicle surroundings of the motor vehicle, for example the route on which the motor vehicle is arranged, can be lit. The lighting serves firstly to allow the motor vehicle to be clearly visible to other road users in adverse visibility conditions, for example when it is dark, on the one hand, and secondly to allow the route or the road to be lit, inter alia, in order to allow the driver of the motor vehicle to safely drive the motor vehicle on the route. Furthermore, the lighting needing to be provided by use of the motor vehicle is regulated by legal requirements and standards.

A motor vehicle of the type in question is a vehicle that can be driven by use of a drive device in the intended driving mode. The drive device can be a drive device that includes an internal combustion engine or else an electrical machine. Naturally, there may also be provision for combinations of these. The motor vehicle may be a car, for example an automobile.

Modern motor vehicles have one or more pixel lamps by use of which light distributions for lighting the vehicle surroundings, for example the route, can be provided in a highly flexible manner. As such, for example prescribed light distributions can be produced and provided that light for example a road of the route on which the motor vehicle is driven. Alternatively, the wider surroundings of the motor vehicle can be lit by use of the pixel lamp.

A pixel lamp is a lamp that is able to provide light distributions in a highly flexible manner on the basis of its design. For this purpose, it may be designed for example on the basis of light emitting diodes that are arranged in the lamp in a style of a matrix. On the basis of the light distribution needing to be provided in prescribable fashion by use of the control signal, the light emitting diodes have electric power applied to them by use of a lamp controller in order to emit light accordingly. Furthermore, there may also be provision for laser lamps as pixel lamps, which have a conversion material that emits conversion light when a laser light is applied. By applying the laser light, if need be at different light intensity, to different points on the conversion material as appropriate, it is possible for almost any light distribution to be achieved. Naturally, there may also be provision for appropriate combinations of such lamp designs.

Furthermore, modern motor vehicles include vehicle cameras so as for example to allow autonomous driving and/or also to supply driver assistance systems with required data. In combination with pixel lamps, oncoming objects, for example oncoming motor vehicles, can thus be captured, for example, and the light distribution provided by use of the pixel lamp can be adapted as appropriate so as not to dazzle the applicable captured objects as far as possible.

As such, for example German Patent Application No. 10 2014 000 935 A1 describes a method and an arrangement for producing a road light display for vehicles. This is supposed to allow projectable information to be presented on a surface with as little distortion as possible for the driver of the vehicle.

Furthermore, German Patent Application No. 10 2011 081 396 A1 describes a method and a controller for adapting a radiation characteristic of a lamp. An object to be highlighted is supposed to be ascertained and the radiation characteristic of the lamp is supposed to be adjusted such that the object is lit in highlighted fashion by use of the lamp.

Furthermore, German Patent Application No. 10 2015 207 543 A1 describes an apparatus and a method for controlling a vehicle lamp of a motor vehicle that are supposed to automatically adapt the lighting of a road so as not to dazzle oncoming road users.

Furthermore, German Patent Application No. 10 2012 003 158 A1 describes a method and an apparatus for projecting a laser light image into surroundings around a vehicle.

Finally, German Patent Application No. 10 2010 029 194 B4 describes a method and a controller for plausibilizing a beam range test value for a cone of light from a vehicle lamp.

Even if the related art has proved itself, there is still a need for improvement.

Modern lamps and vehicles are in the form of pixel lamps and light an area in front of the vehicle. Special functions that are switchable on and off, such as foglamps or the like, are known from the related art besides more complex techniques, such as matrix lighting. Further, it is already known that high-resolution lamps are being planned and developed that permit high accuracy, matrix functionality and the imaging of patterns on the road. Lines representing the width of the vehicle and images relating to the possible braking distance are being discussed, besides displayed pedestrian crossings. These involve the lamp or its lamp controller being controlled by use of a control signal by taking into consideration data from the vehicle, such as steering angle, velocity and firmly programmed values such as a vehicle width and/or the like.

Roads today bear many markings on the surface that are supposed to direct and control the traffic.

Markings projected onto the road by use of high-resolution lamps are static, apart from the matrix functions. The vehicle camera can be used to ensure correct representation, but all functions are markings that are additionally displayed so as to be visually discernible by the driver of the motor vehicle. If there are already markings permanently on the road, then the projected markings are overlaid with those that are permanently present.

An example that may be mentioned is a direction arrow on the road, pointing left. If it is no longer possible to turn left, however, for example on account of roadworks, additional markings can signal this. As such, for example a navigation device can point straight on and a direction indicator possibly displayed by the lamp can likewise point forwards. This projected marking is overlaid by that printed on the road, however. This can lead to confusion for the driver, who has to reconcile the marking permanently applied to the road with that projected by the navigation device in his head.

SUMMARY

The disclosure is therefore based on improving the projecting of markings according to a method, a control device, and a motor vehicle as described herein. Further advantageous configurations are also described.

In regard to a method of the type in question, it is proposed for example that the image sequence is provided at an image sequence frequency of greater than approximately 24 Hz, for example greater than approximately 90 Hz, or greater than approximately 100 Hz, wherein the image sequence includes at least one reference image for uniformly lighting the route, the vehicle camera is synchronized to the reference image for the purpose of capturing the route, the at least one advisory route accoutrement and information data associated with the advisory route accoutrement are ascertained from the provided camera data with reference to the reference image, the associated information data are compared with data of a database, and the control signal is ascertained on the basis of the comparison.

In regard to a control device of the type in question, it is proposed for example that the control signal unit is further designed to provide the image sequence at an image sequence frequency of greater than approximately 24 Hz, or greater than approximately 90 Hz, or greater than approximately 100 Hz, wherein the image sequence includes at least one reference image for uniformly lighting the route, to synchronize the vehicle camera to the reference image for the purpose of capturing the route, and the evaluation unit is designed to ascertain the at least one advisory route accoutrement and information data associated with the advisory route accoutrement from the provided camera data with reference to the reference image, and to compare the associated information data with data of a database, and the control signal unit is further designed to ascertain the control signal on the basis of the comparison.

On the motor vehicle, it is proposed that the control device is designed according to the disclosure set forth herein.

The disclosure is based on the idea that uniform illumination of the vehicle surroundings at a prescribable lighting level allows provision of the opportunity to use the vehicle camera to reliably capture the route, for example advisory route accoutrements of the route. In this case, the uniform lighting is chosen such that it does not hinder other road users as far as possible. For this purpose, the disclosure proposes that a reference image, which is inserted into the image sequence or replaces an existing image from the image sequence, is used to provide the uniform lighting for a short moment, the length of time being chosen such that no significant detriment is to be expected, for example for the human eye. This is achieved by virtue of the image sequence frequency being chosen to be appropriately high, so that an inertia in the detection of light can be used to prevent or reduce the disturbance for the other road users, for example people, for example drivers of other motor vehicles or the like.

In order to allow the vehicle surroundings to be captured during the active reference image, the vehicle camera is synchronized as appropriate. For this purpose, there may be provision for the vehicle camera to have a separate sensor that can ascertain the reference image. There may alternatively be provision for a separate camera control signal to be provided, which can be used to transmit to the vehicle camera the information concerning when the pixel lamp is controlled in accordance with the reference image. Finally, there is also the opportunity, if the image sequence is provided in the style of a video sequence, to synchronize the capture to the video sequence, the synchronization of the capture to the video sequence automatically also being able to achieve synchronization to the reference image.

The vehicle camera can be for example a video camera, a still camera and/or the like. The vehicle camera may have an electronic recording unit, for example a digital recording unit, so that, in accordance with the captured vehicle surroundings, camera data can be provided that are digital data.

The pixel lamp is a lamp that has a plurality of singularly or individually controllable pixels arranged in the style of a matrix that are able to be actuated in a suitable manner in order to be able to adjust the emanated light from the pixel lamp according to the respective current image from the image sequence in accordance with the control signal. A pixel of the pixel lamp is therefore for example a substantially punctiform light source. The light source can be formed for example by a light emitting diode, but also in principle by a gas discharge lamp, an incandescent lamp and/or the like. These light sources can be combined to produce a matrix, which can also include a lamp controller by use of which the individual light sources are controllable in an appropriate manner according to the control signal. The pixel lamp can furthermore also include a laser light source in the style of a laser scanner, which is controlled as appropriate so that a light distribution can be provided according to the control signal. Furthermore, the pixel lamp can naturally include further optically active elements that are able to adapt the light from the pixel lamp that is emitted by the individual light sources in a desired manner in order to emanate light according to the light distribution, for example refractory elements such as lenses, prisms and/or the like, reflective elements such as for example mirrors, for example micromirrors, DMDs (digital mirror device), combinations of these and/or the like.

The vehicle surroundings cover at least part of an area around the vehicle, which may be bounded by the range of vision of the driver, for example. The vehicle surroundings include, for example, the route, which may also merely be a road on which the motor vehicle is guided, a footpath arranged beside a road, a road border, road signs associated with the road, and combinations of these or the like. Sub-areas of the vehicle path can also be covered.

The pixel lamp can be used to light at least part of the route, for example in an area that the motor vehicle travels into during the intended driving mode. The pixel lamp is therefore used for at least partly lighting the vehicle path. However, the motor vehicle does not just need to have a single pixel lamp, but rather can also have two or more pixel lamps that can be actuated jointly in a suitable manner, for example by use of the control signal, which can be used to control more than just a single lamp, or else by use of separate control signals for each individual one of multiple pixel lamps. The pixel lamp is for example a high-resolution lamp, which can include one million pixels or more, for example.

The control signal itself can be provided by a control signal unit and is for example an electrical signal, for example in the form of a digital signal. The control signal represents an image sequence of images in the style of a video sequence, which are used to control the pixel lamp as appropriate. The pixel lamp is for example used to use a respective image from the image sequence, which image is currently provided by use of the control signal, to control the light sources of the pixel lamp. The pixel lamp is therefore designed to emanate light in the style of a projector, for example a video projector.

At least the lit vehicle path is captured by use of the vehicle camera. Depending on configuration, there may also be provision for the vehicle camera to capture just a pre-scribable area of the lit vehicle path. For example, there may be provision for the vehicle camera to capture just a portion of the lit area that is arranged in front of the motor vehicle in the direction of travel in the intended driving mode. Alternatively, there may be provision for the vehicle camera to capture the whole vehicle path. The vehicle camera may be in the form of a single physical unit and arranged in a suitable position on the motor vehicle. The vehicle camera may also be of multipartite design, so that it can capture the vehicle path in different directions in directionally selective fashion, for example, and provides corresponding camera data.

There is furthermore provision for an evaluation unit that receives the camera data from the vehicle camera and evaluates them by taking into consideration a prescribed light distribution, for example. This allows the control signal for controlling the pixel lamp to be ascertained and provided.

The prescribed light distribution is a light distribution that is supposed to be provided by use of the pixel lamp as a setpoint light distribution, for example. The prescribed light distribution can be provided by a superordinate vehicle controller, a control element operable by use of manual operation by the driver of the motor vehicle, and/or the like. By way of example, the prescribed light distribution can represent a high beam, a low beam and/or the like.

The evaluation unit can be used to evaluate the camera data and to detect oncoming vehicles or other road users, for example. If other road users are detected, there may be provision for subsequent images from the image sequence to be changed such that a solid angle that the other road user is at is cut out or prevented from being dazzled.

The image sequence includes at least one reference image for uniformly lighting the vehicle surroundings. The reference image thus results in the light sources of the pixel lamp being actuated such that they emit light at approximately the same light intensity. There may be provision for the light sources to be actuated to emit the maximum light intensity. The vehicle camera, which is synchronized to the reference image and captures the vehicle surroundings in a manner synchronized to the reference image, delivers applicable camera data to the evaluation unit. The evaluation unit can then use the camera data to ascertain details that would otherwise not be able to be identified in the images of the image sequence, for example because an applicable lighting in the respective area is insufficient, or an applicable area cannot be covered on account of the vehicle camera being overridden on account of excessive exposure to light. In this manner, it is possible to detect for example road areas covered by ice or water. Further, it is also possible for further vehicle details of motor vehicles that are oncoming or traveling ahead, for example, to be ascertained. Furthermore, there is naturally the possibility of adapting the control signal as appropriate by adapting images following the reference image by taking into consideration the insights obtained from the evaluation. As such, it is possible to light for example a road area covered by ice or water to a lesser extent, so that the driver of the motor vehicle or else further road users are not dazzled as far as possible.

The camera data with reference to the reference image can be used by the evaluation unit, for example by use of an algorithm, to search the camera data for known objects as advisory road accoutrements, examples that may be mentioned include stop signs, direction arrows, double roadway markings (yellow/white), warnings and/or speed indications.

For the ascertained advisory road accoutrements, the evaluation unit ascertains information data associated with the respective advisory road accoutrements, for example the direction of travel prescribed by a road marking, or the like. The information data determined with reference to a respective ascertained advisory road accoutrements are then compared with the data of a database. The database contains data from the internet, GPS data, data from the vehicle camera, evaluation of road signs, traffic radio, other sensor data, information concerning the position of the vehicle and/or the like. On the basis of the comparison, the control signal is then ascertained by use of the control signal unit, which is coupled to the evaluation unit for communication purposes.

In the event of concordance, an action can be stopped or the advisory road accoutrement can be highlighted. In the event of a lack of concordance, adaptation of the images of the image sequence in specific areas allows the advisory road accoutrement, for example the marking on the road, to be made less visible. It is also possible to actively "superimpose" or cross through the advisory road accoutrement with other projected markings.

The control device therefore adapts static advisory road accoutrements of the route to the dynamic information from the sensors and data and therefore removes the information difference between static advisory road accoutrements and the actually existing surroundings. In this case, it is found to be advantageous that the reference image is activated just for a very short period of time, which means that the driver of the motor vehicle and also the other road users are substantially not adversely affected.

The disclosure is found to be suitable for example for later installation or application in the motor vehicle or the pixel lamp. Since pixel lamps of the type in question can already be actuated using a control signal in the style of a video sequence, the disclosure can easily be implemented without it being necessary to interfere with a design of existing concepts. Since a single reference image is averaged with the values of the next 23 subsequent images by the human eye, the other road users notice substantially no kind of dazzling. As a result, the disclosure allows the vehicle camera to record a detailed image of the route, for example of advisory road accoutrements, without disturbing the other road users. At the same time, the disclosure allows advisory route accoutrements that are present to be reliably detected. For example, the lighting of the road can be actively controlled such that the vehicle camera can detect and classify as many objects as possible.

One advantage lies in the fact that existing components of the vehicle can continue to be used. The high-resolution lamps or pixel lamps of up-and-coming vehicles, which are introduced for better illumination of the road and for interaction with road users, presuppose the same sensors as the solution presented here. Since these modules are actuated using a video sequence, the embedding of individual frames or images with control patterns is not a difficulty. The repetitive inverting of defined areas is also possible with this technique.

The driving of the driver can be improved because the information visually transferred to the driver via the road is again concordant with the information conveyed to the driver from other sources. Dissonances that can distract or confuse the driver are avoided.

The data collected about the existing road lettering, for example, can be used as a database for traffic databases.

It is further proposed that if the information data differ from the data of the database, the images of the image sequence are ascertained such that an advisory route accoutrement corresponding to the data of the database is projected in a visually discernible fashion by use of the pixel lamp. This allows the visual driving of the motor vehicle to take place more reliably.

Furthermore, it is proposed that at least part of the ascertained advisory route accoutrement is overlaid with the projected advisory route accoutrement in a visually discernible fashion. The effect that can be achieved thereby is that the ascertained advisory route accoutrement fades visually into the background and is perceived less. Further, the projected advisory route accoutrement can come to the fore and thus lead to more reliable perception of the actually desired traffic management for example for the driver of the motor vehicle but also, if need be, of autonomous vehicle control.

For example, at least part of the ascertained advisory route accoutrement is embedded into the projected advisory route accoutrement. This allows the ascertained advisory route accoutrement to become part of the projected advisory route accoutrement, which allows visual perceptibility to be improved further.

Furthermore, it is proposed that if the information data differ from the data of the database, the images of the image sequence are ascertained such that at most part of the ascertained advisory route accoutrement is lit. For example, it is lit only in areas in which a projection in accordance with the projected advisory route accoutrement also takes place. Parts of the ascertained advisory route accoutrement that are outside the projected advisory route accoutrement are able not to be lit or at least to be lit to a reduced extent, for example. As a result, these parts of the ascertained advisory route accoutrement fade visually into the background, as a result of which visual perceptibility can likewise be improved further.

It is furthermore proposed that the camera data are used to ascertain at least one overexposed or underexposed area of the lit route. For example the camera data captured by use of the vehicle camera during the reference image are used for this purpose.

It is further proposed that the images from the image sequence that follow the reference image are ascertained on the basis of the at least one overexposed or underexposed area. In this configuration, the images from the image sequence that follow the reference image are thus adapted as appropriate on the basis of the evaluation using the camera data during the reference image in order to improve the lighting for the route, for example the road. This allows specific areas of the route that glow very brightly and may dazzle the driver or the vehicle camera, or else areas in which visibility is adverse on account of inadequate lighting, to be illuminated in an improved manner by adapting the images and consequently also adapting the emanated light from the pixel lamp. Naturally, the disclosure does not need to be restricted to a single area, but rather multiple overexposed or underexposed areas can also be ascertained at the same time.

It is furthermore found to be advantageous if the image sequence repeatedly includes reference images, wherein successive reference images are at intervals of time of at least approximately 0.5 seconds, for example at least approximately 0.8 seconds from one another. The reason is that it has been found that when the reference images are at such an interval from one another, an adverse effect for the driver and/or the other road users can be largely avoided, and at the same time a reliable functionality can be ensured. Alternatively or additionally, there may also be provision for the interval of time between the reference images to be dependent on a vehicle velocity of the motor vehicle. As such, there may be provision for the reference images to follow one another at short intervals of time at a high vehicle velocity, whereas at a low vehicle velocity, for example when maneuvering or the like, the intervals of time from one another can be increased. Furthermore, it is naturally also possible for further vehicle parameters to be taken into consideration in order to be able to set the intervals of time between the successive reference images. The reference images do not need to follow one another at equal intervals of time, but rather there may furthermore be provision for the intervals of time between the reference images to vary.

It is further proposed that the reference image is provided by use of a reference control signal that controls the pixel lamp. In this configuration, there is provision for a separate control signal, namely the reference control signal, for providing the reference image. There is therefore no need to interfere with an existing image sequence. For this purpose, there may be provision for the pixel lamp to have a separate input connection at which the reference control signal can be supplied. Alternatively, there may be provision for the reference control signal to be supplied to the control signal unit, which then inserts an applicable reference image into the image sequence or replaces an existing image with the reference image. Comparably, this function may naturally also be provided for the pixel lamp itself.

For example, the reference image is provided by use of the pixel lamp for a period of less than approximately 0.033 second, for example less than approximately 0.01 second. Such a length of time firstly allows the vehicle camera to be used to reliably capture the route with reference to the reference image and secondly allows an adverse effect on other road users or else on the driver of the motor vehicle to be largely avoided.

For example, the pixel lamp lights a road as the route. The pixel lamp is therefore a headlamp of the motor vehicle, for example. It may alternatively be a reversing lamp or a supplementary lamp or the like.

Furthermore, it is proposed that the vehicle camera is used to ascertain visibility and the method is performed on the basis of the ascertained visibility. In this manner, it is possible for the procedure to be employed in optimized fashion, namely for example when there are adverse light conditions and vision, for example of the driver of the motor vehicle or else of other road users, is impaired. By way of example, there may be provision for the vehicle camera to be used to detect bright surroundings or else precipitation, with the applicable procedure then being activated. Accordingly, the procedure can also be deactivated again if the vehicle camera has been used to ascertain an improvement in visibility or the applicable prerequisites that have activated the procedure have disappeared.

The effects and advantages indicated for the method described herein apply in equal measure to the control device described herein and to the motor vehicle equipped with the control device described herein, and vice versa. For example, it is therefore also possible for method features to be assigned corresponding apparatus features and worded as such, and vice versa.

Developments of the method that have features as have already been described in connection are included with the developments of the motor vehicle. For this reason, the applicable developments of the method are not described again.

BRIEF DESCRIPTION OF THE DRAWINGS

These and other aspects and advantages will become more apparent and more readily appreciated from the following description of the example embodiments taken in conjunction with the accompanying drawings of which.

DETAILED DESCRIPTION

Reference will now be made in detail to examples which are illustrated in the accompanying drawings, wherein like reference numerals refer to like elements throughout.

In the embodiments described below, the described components of the embodiments are each individual features that may be considered independently of one another and each also develop the disclosure independently of one another, and hence can also be regarded as part of the disclosure individually or in a combination other than that shown. In addition, the described embodiments are also able to have further already described features added to them.

In the drawings, elements having the same function are each provided with the same reference signs.

Figure 1:
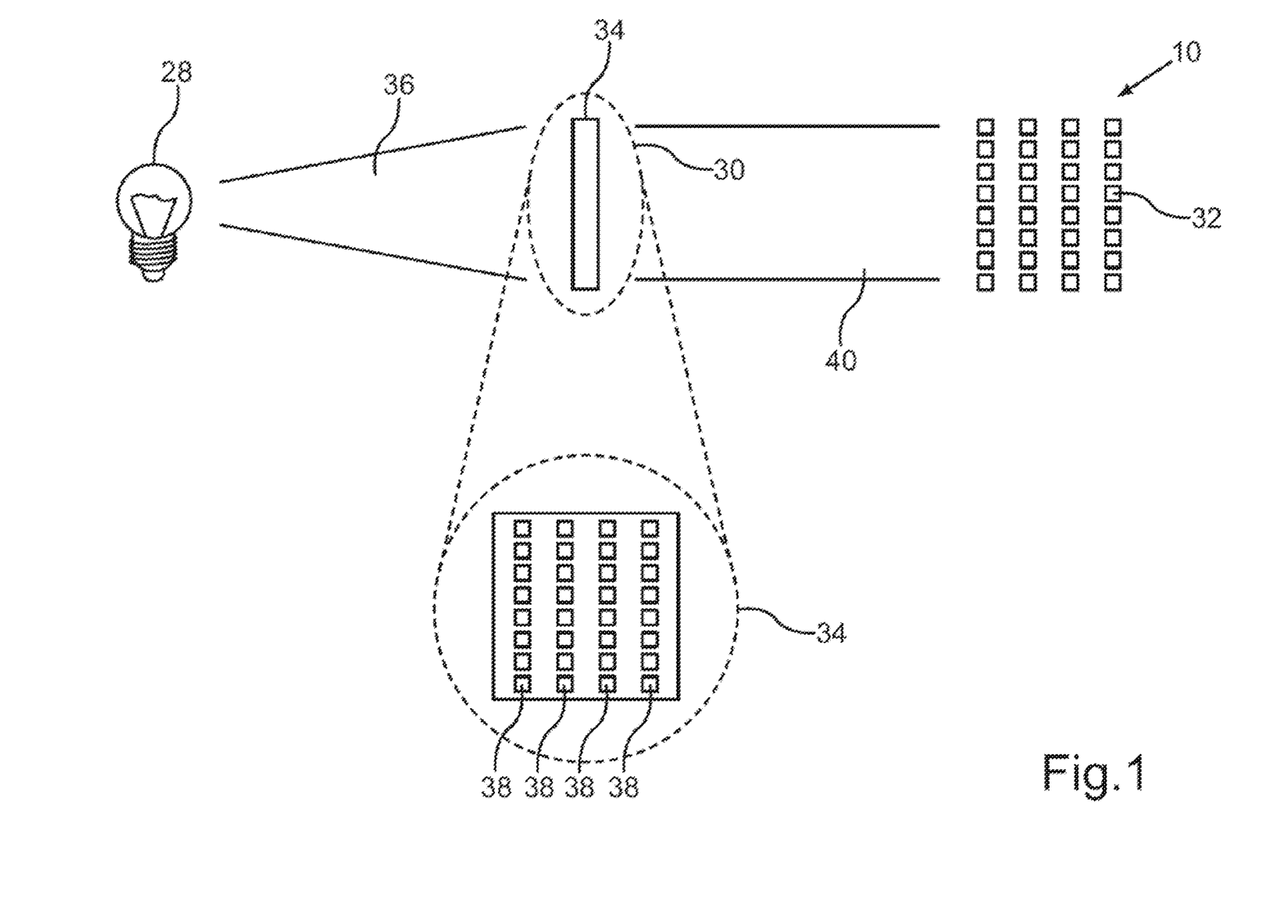
FIG. 1 schematically illustrates a first configuration of a pixel lamp.

FIG. 1 uses a schematic depiction to show a first configuration for a pixel lamp 10 by use of which the method can be carried out. The pixel lamp 10 includes a light source 28, which can be formed by a gas discharge lamp, for example. Alternatively, there may naturally also be provision for a laser light source, an appropriately powerful light emitting diode, an incandescent lamp or the like. The light source 28 emits light 36, which is supplied to a matrix 34. The matrix 34 has individual elements 38 that can be individually switched to transparent or nontransparent. This provides individual pixels for the pixel lamp 10. A lower enlarged depiction 30 depicts a schematic plan view of the matrix 34, in which the individual elements 38 are identifiable. On the basis of a respective actuation of the pixel lamp 10 by use of a control signal, the applicable elements 38 are switched to transparent or to nontransparent, so that an appropriate light pattern or a light distribution is provided, according to which light 40 is emanated. An emanated light from the light 40 is depicted by 32 and is provided when all of the elements 38 of the matrix 34 are switched to transparent.

Figure 2:
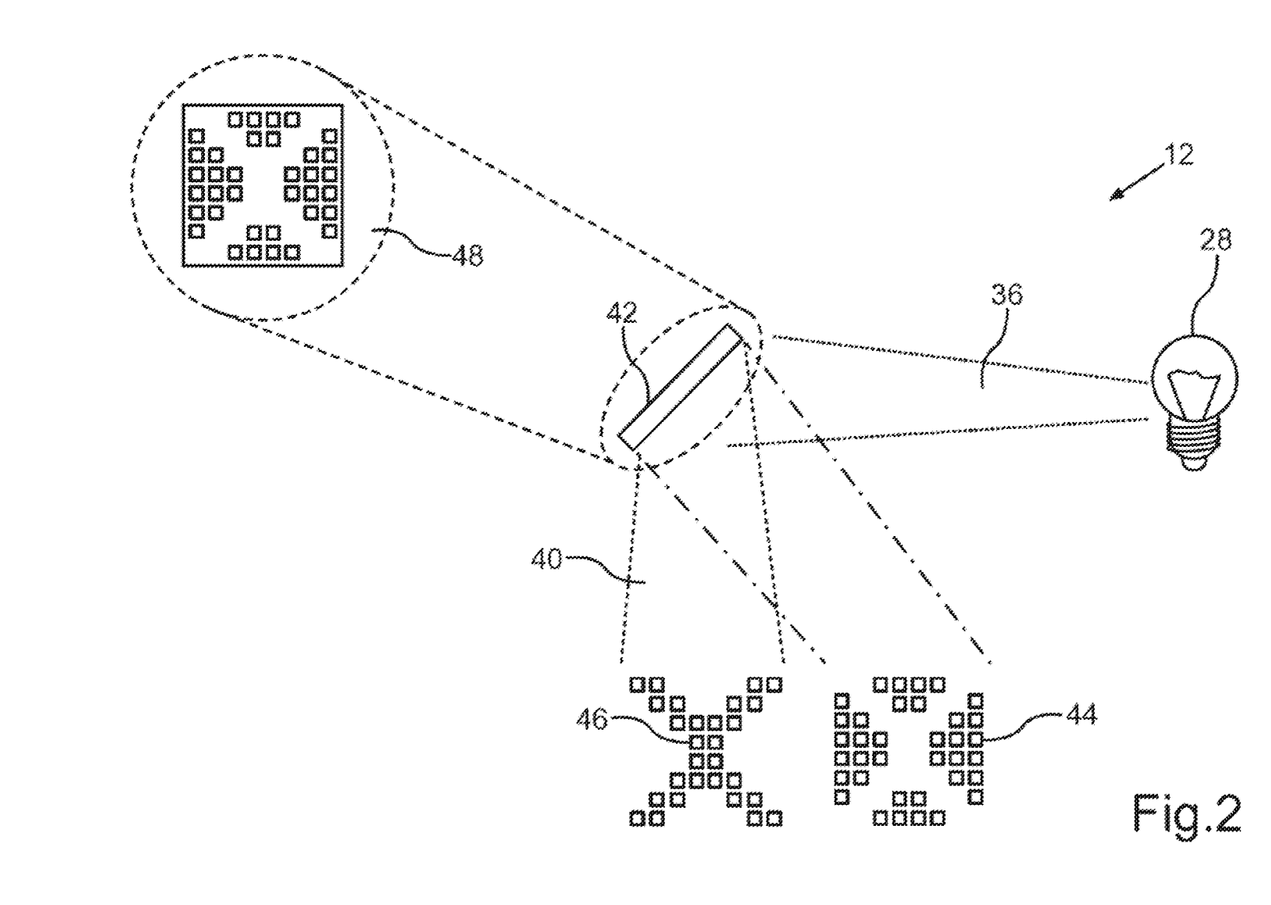
FIG. 2 schematically illustrates a second configuration of a pixel lamp.

FIG. 2 shows a second configuration for a pixel lamp 12 by use of which the method can be implemented. The pixel lamp 12, like the pixel lamp 10 shown in FIG. 1, has the light source 28, which emits light 36. In FIG. 2, the light 36 is supplied to a mirror matrix 42, which is divided into individual parts that can be individually actuated. Depending on the actuation, the light 36 is deflected in a direction corresponding to the individual actuation. The mirror matrix 42 is therefore used to provide the individual pixels of the pixel lamp 12. A current setting for the mirror matrix 42 is depicted in enlarged fashion by 48. This setting of the mirror matrix 42 results in the mirror matrix 42 reflecting part of the light 36 and emanating it as light 40 that has a light distribution according to the depiction 48. The other elements 46 of the mirror matrix 42 are used to deflect the light 36 into a light trap 44. The pixel lamp 12 therefore delivers a light distribution according to the emanated light 40.

Figure 3:
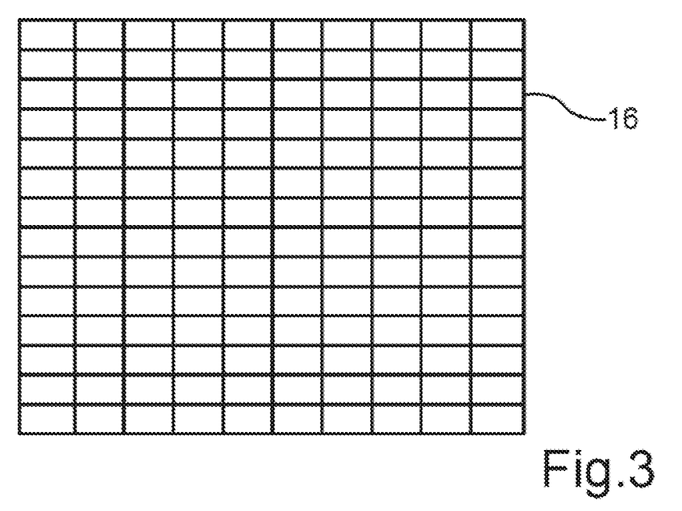
FIG. 3 is a schematic depiction of an emanated light when the pixel lamp shown in FIG. 1 or 2 is actuated with a reference image.
Figure 4:
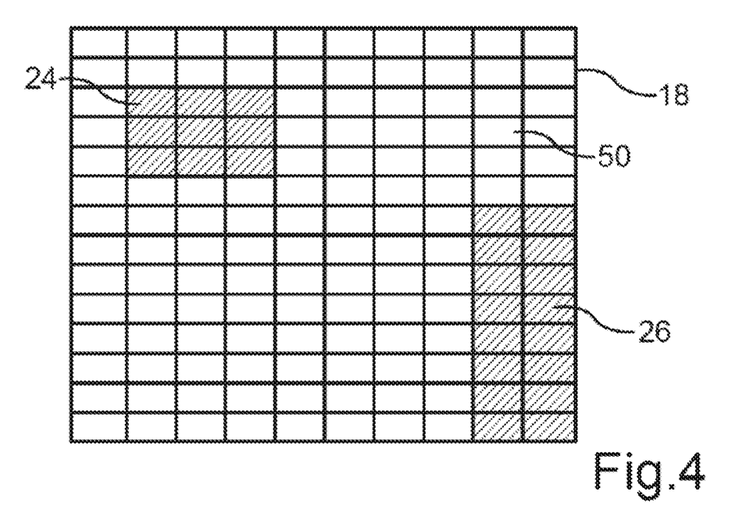
FIG. 4 is a schematic depiction of an emanated light when the pixel lamp shown in FIG. 1 or 2 is actuated with an image from an image sequence.
Figure 5:
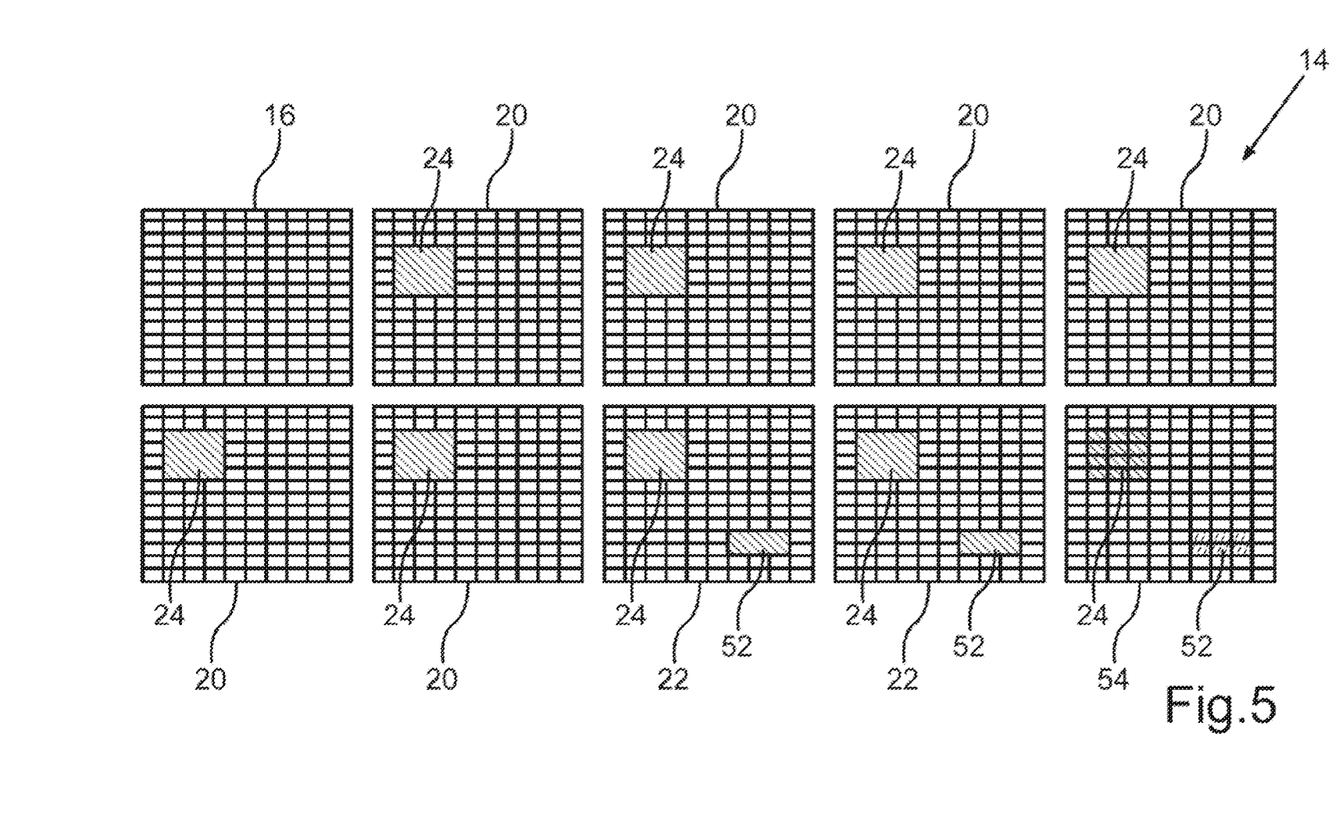
FIG. 5 is a schematic depiction of a portion of an image sequence for actuating the pixel lamp shown in FIG. 1 or 2.

FIGS. 3 to 5 subsequently show a method for lighting vehicle surroundings of a motor vehicle in which the pixel lamp 10, 12 of the motor vehicle, which is not depicted in the drawings, emanates light 40 on the basis of a control signal that represents an image sequence 14, in order to light at least part of the vehicle surroundings.

A respective single image 20, 22 (FIG. 5) from an image sequence 14 corresponds to a respective light distribution currently needing to be provided by the pixel lamp 10, 12. The lit vehicle surroundings are captured by use of a vehicle camera, not depicted, that provides corresponding camera data 18 (FIG. 4). FIG. 4 depicts an evaluation of the camera data 18, according to which the camera data 18 cover an area 24 in which lighting is excessive, which means that dazzling can occur. Further, the camera data 18 reveal that an area 26 has been ascertained in which lighting is inadequate. As such, contrasts cannot be identified sufficiently in the areas 24, 26. In a remaining area 50, a normal illumination in a permissible area has been captured.

The camera data 18 are evaluated by use of an evaluation unit, likewise not depicted, by taking into consideration a prescribed light distribution, for example a high beam, in order to ascertain and provide the control signal for controlling the pixel lamp 10, 12.

The image sequence 14 (FIG. 5) is provided at an image sequence frequency of, for example, approximately 100 Hz. The image sequence 14 includes a reference image 16 (FIG. 3), which is used for uniformly lighting the vehicle surroundings. There may be provision for all of the pixels of the pixel lamp 10, 12 to deliver maximum brightness.

The vehicle camera captures the vehicle surroundings with reference to the reference image 16 by being synchronized accordingly. The actuating of the pixel lamp 10, 12 by use of the reference image 16 results in the vehicle camera capturing the camera data 18 while the reference image 16 is depicted by use of the pixel lamp 10, 12. The camera data 18 therefore correspond to a recording while the reference image 16 is depicted by use of the pixel lamp 10, 12. The camera data 18 are depicted on the basis of FIG. 4, for example.

The control signal is then ascertained by use of the evaluation unit on the basis of the camera data 18 captured with reference to the reference image 16.

FIG. 5 shows a video sequence, or the image sequence 14, that represents the control signal in order to be able to actuate the pixel lamp 10, 12. The order of the individual images in time is from left to right and from top to bottom.

A first image is formed by the reference image 16. While this reference image 16 is used to control the pixel lamp 10, 12, the vehicle camera captures the vehicle surroundings and supplies camera data 18 (FIG. 4). On the basis of the camera data 18, the subsequent images 20 are ascertained, in which the area 24 has reduced light intensity in order to prevent an oncoming object from being dazzled or to cut out the object. The six images 20, which are immediately successive, therefore control the pixel lamp 10, 12 in consideration of the emanated light for the further six cycles or frames.

Further evaluation of the camera data 18, for example by taking into consideration the area 26 (FIG. 4), likewise cuts out, or prevents dazzling for, areas 52 in which a reduced lighting is desired in order to reduce dazzling on account of ice or water. This is achieved with the images 22 that follow the images 20. A subsequent image 54 shows that the cutting-out is reduced in the areas 24, 52. In these areas, the pixels are therefore again actuated to partly emanate light.

The portion of the image sequence 14 that is depicted in FIG. 5 shows the basic procedure. In the configuration, there is provision for 100 images 16, 20, 22, 52 per second to be provided in succession as a control signal. Depending on requirements, there may be provision for additional reference images 16 in the image sequence 14. In the configuration, there is provision for every thirtieth image to be a reference image 16. Naturally, the image rate or the interval of time between the reference images 16 can also be varied according to need in order to be able to adapt the procedure to current requirements in a suitable manner.

The exemplary configurations described below for controlling a high-resolution lamp such as the pixel lamp 10, 12 permit the generation of patterns in very short intervals. Since the human eye averages the brightness of an observed surface over time, it is possible to introduce individual images such as the reference image 16, which are not detected by the observer.

The concept involves the image repetition frequency being chosen to be such that it is possible to use the reference image 16 to display a full image without this being noticed by the driver. It is therefore possible to cut out objects, for example by use of matrix beam technology, and still to illuminate the whole road on the route for a very short period.

The vehicle camera is synchronized to the pixel lamp 10, 12 such that it can record camera data 18 when the road is fully lit in accordance with the reference image 16 and can forward the reference image separately.

The evaluation unit searches the camera data of the fully lit image for known symbols as advisory route accoutrements such as for example arrows, markings, warnings and/or the like and assigns them defined statements as information data, for example left turn, frost, diverging lane and/or the like. These statements are then compared against a database and examined for inconsistencies.

The following are examples that may be mentioned:

In a tunnel, a turn arrow pointing right is painted on the road, but from traffic radio and signs it is known that the exit is closed.

Repairs to the road mean that parts of the marking are missing, but it is known from GPS and preceding markings where the median strips are supposed to be, for example.

The road bears a direction indication, for example "Center", but a diversion means that this road no longer leads to the center but rather leads to the outskirts.

As a result of renovations, the road bears yellow markings and the white markings are invalid.

The information on the road is correct and is supposed to be made more clearly visible.

The evaluation unit then reacts dynamically to the road symbols. To this end, it can include a program-controlled computer unit. The program can perform a suitable algorithm. Since the velocity of the motor vehicle is known and the position of the symbols or markings can be evaluated at a high frequency by use of the images of the image sequence 14 using the vehicle camera, it is possible to follow the movement and outlines of the symbols or markings within the driver's vision. Unwelcome and incorrect information can then be cut out, altered or restricted in the remaining or subsequent images. Useful information can be made clear.

Figure 6:
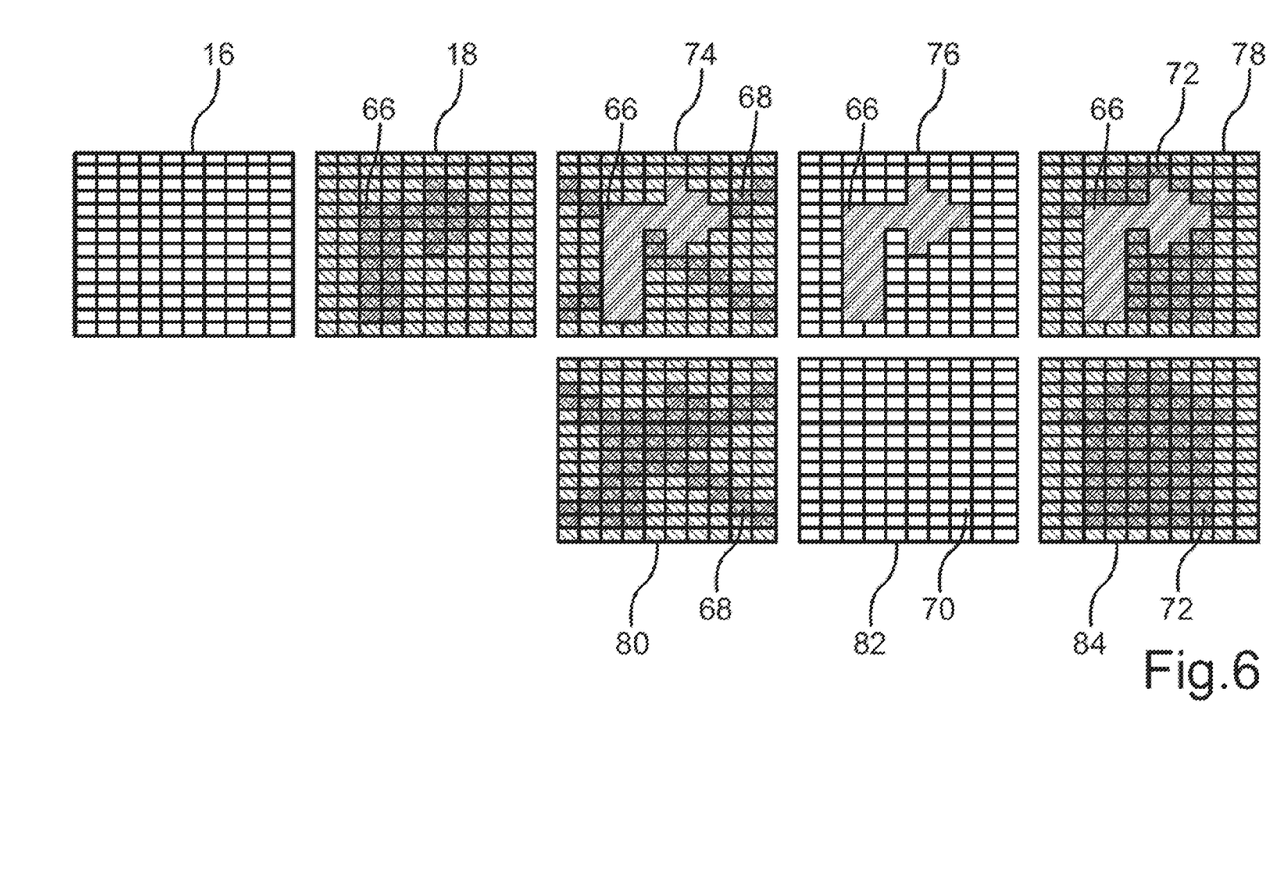
FIG. 6 includes schematic depictions according to an example.

FIG. 6 shows examples of the use of the method on the basis of a direction arrow 66 on a road on a route. By use of the method for controlling the pixel lamp 10, 12 of a motor vehicle arranged on a route, in which the pixel lamp 10, 12 emanates light 40 on the basis of a control signal that represents an image sequence 14, in order to light at least part of the route. A respective individual image from the image sequence 14 corresponds to a respective light distribution currently needing to be provided by the pixel lamp 10, 12. The lit route is captured by use of a vehicle camera that provides corresponding camera data 18. The camera data 18 are evaluated in order to ascertain an advisory route accoutrement, for example the direction arrow 66, and to provide the control signal for controlling the pixel lamp 10, 12 on the basis of the ascertained advisory route accoutrement.

According to an example, the image sequence 14 is provided at an image sequence frequency of greater than 100 Hz. The image sequence 14 includes a reference image 16 for uniformly lighting the route. The vehicle camera is synchronized to the reference image 16 for the purpose of capturing the route. The advisory route accoutrement and information data associated with the advisory route accoutrement are ascertained from the provided camera data 18 with reference to the reference image 16. The associated information data are compared with data of a database. The control signal is ascertained on the basis of the comparison.

FIG. 6 depicts the reference image 16 on the far left. To the right of that, the camera data 18 captured with reference to the reference image 16 by use of the vehicle camera are depicted.

The depictions 74 and 80 relate to the ascertained arrow 66 being crossed through by use of a projection, provided by the pixel lamp according to an image from the image sequence 14, as emanated light. The image ascertained by use of the control signal unit by taking into consideration the evaluation of the camera data 18 is depicted by 74. The accordingly lit road is depicted by 80. It can be seen that the arrow 66 is not lit. By contrast, a cross 68 is projected brightly. The further area of the image 74 is illuminated according to a normal prescribed light distribution. The depiction 80 shows the projection on the road. The cross 68 is clearly visible. By contrast, the arrow 66 is barely detectable.

With two further depictions 76, 82 relate to the arrow 66 being cut out. For this purpose, the image 76 depicted by use of the pixel lamp 10, 12 is ascertained from the camera data 18. The accordingly lit road is depicted by 82. Only a substantially uniform lighting of the road is detectable, this being denoted by the reference sign 70. The arrow 66 is no longer visible.

Two further depictions 78, 84 relate to the arrow 66 being incorporated into the projection. The arrow 66 is supposed to have an arrow 72 overlaid on it, the latter having been ascertained as actual traffic management on the basis of data of a database. The applicable image is denoted by 78. 84 is the accordingly lit road. Only the arrow 72, which completely includes the arrow 66, is detectable. Therefore only the arrow 72 is now visible.

Figure 7:
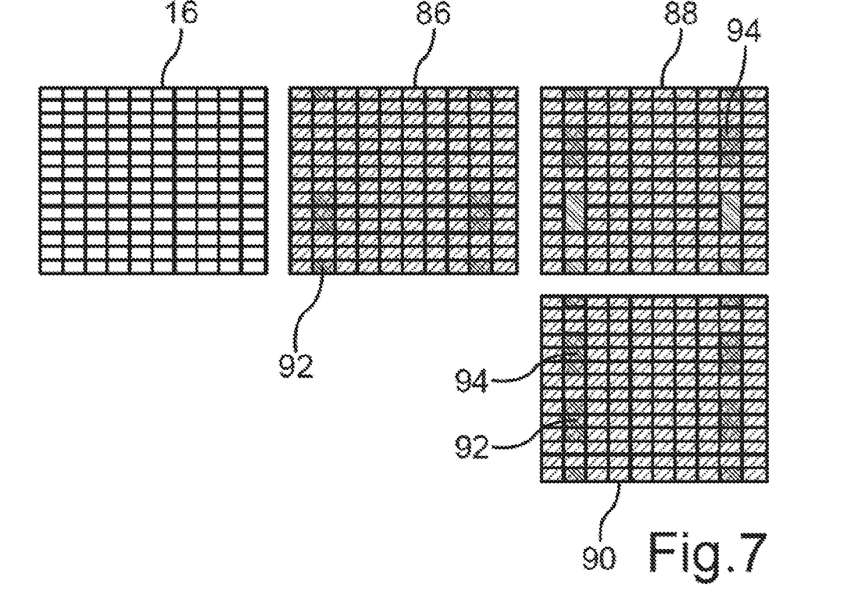
FIG. 7 includes schematic depictions according to an example.

FIG. 7 shows a further example of the use of the method, specifically the visual projection of absent lateral strips. As in the first case relating to FIG. 6, the reference image 16 permits the capture of camera data 86 for the road. The evaluation reveals that lateral strips 92 are depicted, but parts of the lateral strips are missing. The evaluation of the camera data 86 is used to ascertain an image 88 that is used to control the pixel lamp 10, 12. The already detected markings 92 are bright enough and do not need to be lit further, whereas the rest of the road is lit at average light intensity. Areas having the absent lateral strips 94 are lit to the maximum extent. A continuous pattern of lateral strips is obtained on the road, as depicted by 90.

Figure 8:
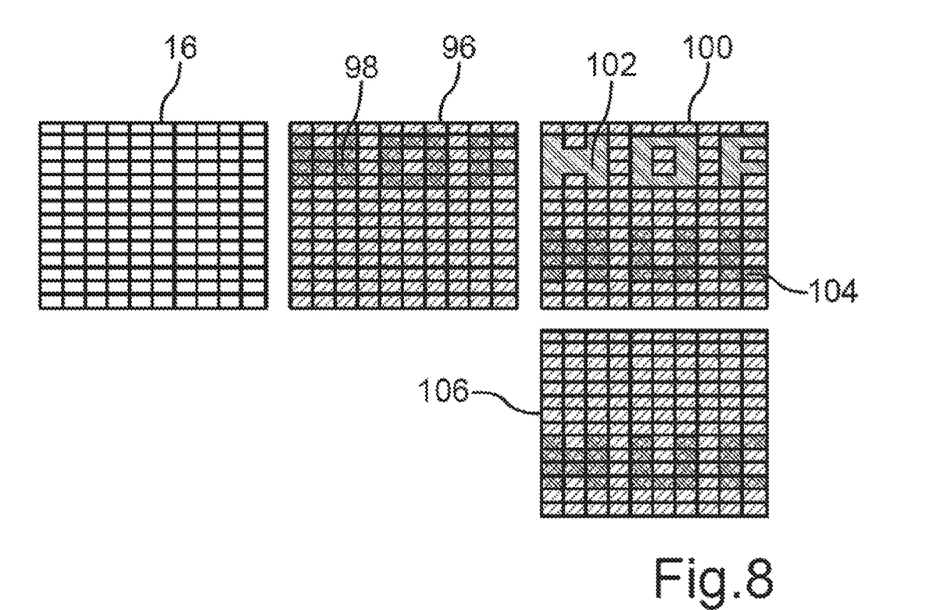
FIG. 8 includes schematic depictions according to an example.

FIG. 8 shows a further example of the use of the method, specifically replacement of a road lettering for traffic control. The reference image is again depicted by 16. The associated camera data are denoted by 96. The evaluation reveals that the lettering 98 "Hof" is present on the road. Since the database shows that this road now leads not to Hof but rather to Munich (MUC), a mask is ascertained as image 100, the mask darkening the lettering 102 "Hof" and lighting or projecting a lettering 104 "MUC" more intensely. The impression given on the road is that the only lettering present is "MUC". This is shown by the depiction 106 of the road.

It is also possible for invalid markings to be cut out by use of the method. The cutting-out of invalid markings largely corresponds to the configuration shown in FIG. 7, which is why additional reference is made thereto. When the camera data are evaluated with reference to the reference image 16, a distinction is drawn according to the color of the marking. If there are yellow markings present, these are ignored and the white markings are actively cut out as in the case of the configuration shown in FIG. 7. Particularly the yellow markings remain visible to the driver because, unlike the white ones, they continue to be lit by the pixel lamp 10, 12.

Figure 9:
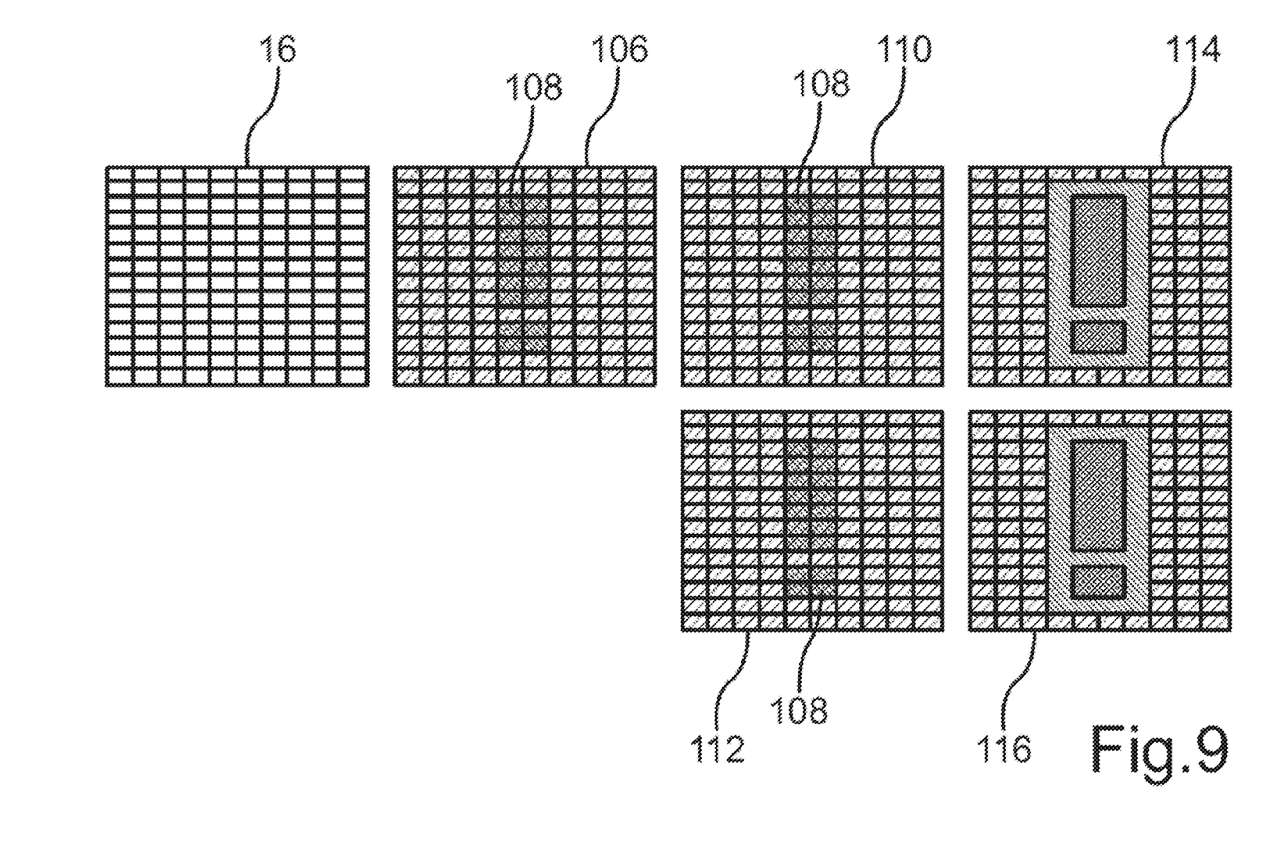
FIG. 9 includes schematic depictions according to an example.

FIG. 9 shows a further example of the use of the method, for example the highlighting of an advisory road accoutrement, for example an exclamation mark 108 on the road. The reference image is again depicted by 16. The associated camera data are denoted by 106. By evaluating the camera data 106, a signal sign, for example the exclamation mark 108, is ascertained. The further evaluation reveals that the database contains data indicating that the exclamation mark 108 is correct. An attempt is therefore made to make the driver aware of this. In a first case, a mask is ascertained as image 110, the mask lighting the road but lighting the exclamation mark 108 to excess. This results in the exclamation mark 108 being highlighted on the road, as shown by the depiction 112. In a second case, an area around the exclamation mark 108 is generated that is darker than the rest of the road lighting and therefore stands out from the rest of the road. An applicable image to be depicted is denoted by 114. The exclamation mark 108 itself is lit especially. This produces a highly lit lettering with a dark border on the road, which is easier for the driver to see on account of the high contrast. This is shown on the basis of the depiction 116.

Figure 10:
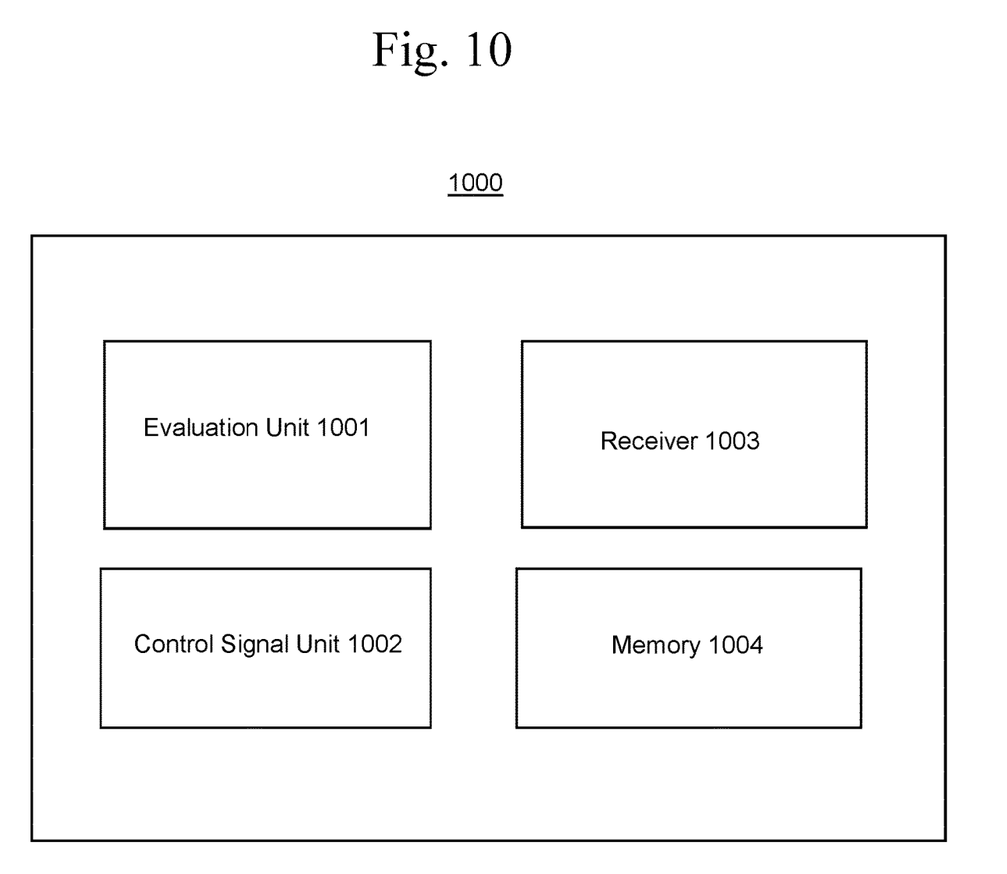
FIG. 10 is a block diagram of a controller, according to an example.

FIG. 10 is a block diagram of a controller, according to an example.

Referring to FIG. 10, the controller 1000 may include an evaluation unit 1001, a control signal unit 1002, a receiver 1003, and a memory 1004. The controller 1000 corresponds to the control device as described herein, the evaluation unit 1001 corresponds to the control signal unit as described herein, and the receiver 1003 corresponds to the receiving unit as described herein. As described above, the evaluation unit 1001 is connected or coupled to the control signal unit 1002 and the receiver 1003, for communication purposes. As described above, the evaluation unit 1001 can include a program-controlled computer unit, i.e., a processor, which executes a program stored in a memory, for example memory 1004 of the controller 1000.

Figure 11:
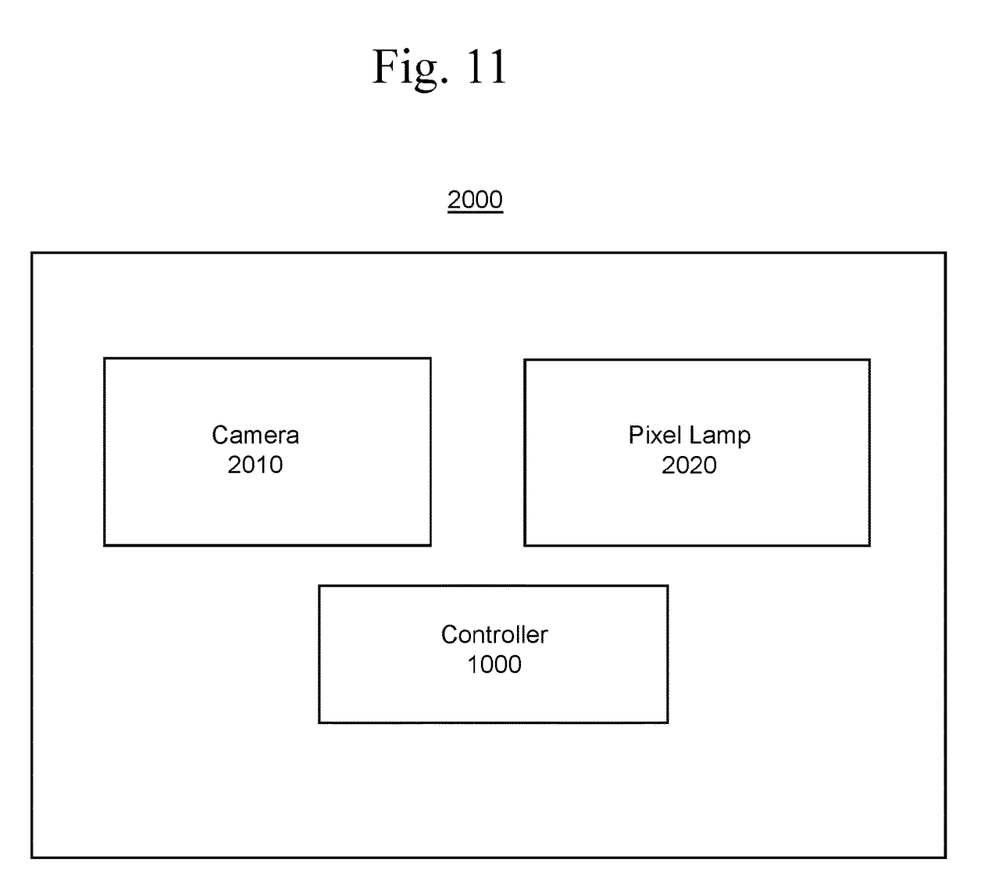
FIG. 11 is a block diagram of a motor vehicle having the controller of FIG. 10, according to an example.

FIG. 11 is a block diagram of a motor vehicle, according to an example.

Referring to FIG. 11, the motor vehicle 2000 may include a camera 2010, a pixel lamp 2020, and the controller 1000. The camera 2010 corresponds to the vehicle camera as described herein, the pixel lamp 2020 corresponds to the pixel lamp as described herein, for example, pixel lamp 10, 12, and the controller 1000 corresponds to the control device as described herein. As described above, the receiver 1003 of the controller 1000 receives camera data of the camera 2010. The controller 1000 controls the pixel lamp 2020 by providing a control signal generated by the control signal unit 1002. The control signal unit 1002 generates the control signal according to at least one advisory route accoutrement determined by the evaluating unit 1001. The evaluating unit 1001 determines the at least one advisory route accoutrement according to camera data provided to the evaluating unit 1001 via the camera 2010 directly or via the receiver 1003.

Overall, the example embodiments show how the method, control device, and motor vehicle can achieve improved lighting of the route, for example of the road, on which the motor vehicle is driven.

The example embodiments serve merely to explain the disclosure and are not intended to restrict it.

A description has been provided with reference to embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for controlling a pixel lamp of a motor vehicle, comprising:
   controlling the pixel lamp to emit light based on control signals that represent an image sequence, to light at least part of a route on which the motor vehicle travels,
      a respective individual image from the image sequence corresponding to a respective light distribution currently needing to be provided by the pixel lamp,
      the image sequence being provided at an image sequence frequency of greater than 24 Hz, and
      the image sequence including at least one reference image inserted into the image sequence or replaces an existing image from the image sequence for a uniform lighting of the at least part of the route, so that the reference image is used to provide the uniform lighting for a short moment;
   receiving camera data of the at least part of the route lit by the pixel lamp, the camera data having been captured by a vehicle camera synchronized to the at least one reference image during capturing of the camera data;
   evaluating the camera data to determine an image of at least one first advisory route accoutrement and information data associated with the image of the at least one first advisory route accoutrement, with reference to the at least one reference image;
   comparing the information data associated with the image of the at least one first advisory route accoutrement with data of a database;
   determining a control signal of the control signals to provide an image of at least one second advisory route accoutrement in the image sequence by use of the pixel lamp, based on the comparing; and
   providing the control signal for controlling the pixel lamp to light the at least part of the route based on the image of the at least one second advisory route accoutrement.

2. The method according to claim 1, further comprising, when the information data differ from the data of the database, determining the image of the at least one second advisory route accoutrement in the image sequence such that the at least one second advisory route accoutrement corresponding to the data of the database is projected in a visually discernible fashion by use of the pixel lamp.

3. The method according to claim 2, further comprising overlaying at least part of the image of the at least one first advisory route accoutrement with the projected image of the at least one second advisory route accoutrement in a visually discernible fashion.

4. The method according to claim 2, further comprising embedding at least part of the image of the at least one first advisory route accoutrement into the projected image of the at least one second advisory route accoutrement.

5. The method according to claim 1, further comprising, when the information data differ from the data of the database, determining the image of the at least one second advisory route accoutrement in the image sequence such that at most a part of the image of the at least one first advisory route accoutrement is lit.

6. The method according to claim 1, further comprising providing the at least one reference image by use of a reference control signal that controls the pixel lamp.

7. The method according to claim 1, wherein
   the image sequence includes a plurality of reference images, and
   successive reference images are provided at intervals of time of at least 0.5 s from one another.

8. The method according claim 1, wherein the at least one reference image is provided by use of the pixel lamp for a duration of less than 0.033 s.

9. A control device for controlling a pixel lamp of a motor vehicle, comprising:
   a control signal unit, comprising a processor, configured to provide control signals that represent an image sequence, to the pixel lamp, so that the pixel lamp emits light to light at least part of a route on which the motor vehicle travels,
      a respective individual image from the image sequence corresponding to a respective light distribution currently needing to be provided by the pixel lamp,
      the image sequence being provided at an image sequence frequency of greater than 24 Hz, and
      the image sequence including at least one reference image inserted into the image sequence or replacing an existing image from the image sequence for a uniform lighting of the at least part of the route, so that the reference image is used to provide the uniform lighting for a short moment;
   a receiver to receive camera data of a vehicle camera that captures the at least part of the route lit by the pixel lamp, the camera data having been captured by a vehicle camera synchronized to the at least one reference image during capturing of the camera data by the control signal unit; and
   an evaluation unit, comprising a processor, connected to the control signal unit and the receiver, configured to:
      receive the camera data from the receiver,
      evaluate the camera data to determine an image of at least one first advisory route accoutrement and information data associated with the image of the at least one first advisory route accoutrement, with reference to the at least one reference image, and
      perform a comparison of the information data associated with the image of the at least one first advisory route accoutrement with data of a database, and
   the control signal unit is further configured to,
      determine a control signal of the control signals to provide an image of at least one second advisory route accoutrement in the image sequence by use of the pixel lamp, based on the comparison, and
      provide the control signal to the pixel lamp to light the at least part of the route based on the image of the at least one second advisory route accoutrement determined by the evaluation unit.

10. The control device according claim 9, wherein the image of the at least one first advisory route accoutrement is from among a road marking on the route, and road signage along the route.

11. The control device according claim 10, wherein when a result of the comparison indicates the image of the at least one first advisory route accoutrement is inconsistent with the data of the database, the image of the at least one second advisory route accoutrement in the image sequence is to alter a visual perception of the at least part of the route for a driver of the motor vehicle.

12. The control device according claim 11, wherein the image of the at least one second advisory route accoutrement in the image sequence to alter the visual perception of the at least part of the route for the driver of the motor vehicle, includes at least one alteration from among alterations including a mask which obscures the image of the at least one first advisory route accoutrement, and a projection which projects a symbol on the at least part of the route.

13. The control device according claim 11, wherein the image of the at least one second advisory route accoutrement in the image sequence to alter the visual perception of the at least part of the route for the driver of the motor vehicle, alters the image of the at least one first advisory route accoutrement so as to visually appear consistent with the data of the database.

14. The control device according claim 11, wherein when a result of the comparison indicates the image of the at least one first advisory route accoutrement is consistent with the data of the database, the image of the at least one second advisory route accoutrement in in the image sequence provides a contrast for the image of the at least one first advisory route accoutrement by decreasing lighting of areas around the image of the at least one first advisory route accoutrement, or increases lighting of the image of the at least one first advisory route accoutrement relative to areas around the image of the at least one first advisory route accoutrement.

15. A motor vehicle, comprising:
   a pixel lamp to emit light based on control signals that represent an image sequence, to light at least part of a route on which the motor vehicle travels,
   a respective individual image from the image sequence corresponding to a respective light distribution currently needing to be provided by the pixel lamp,
   the image sequence being provided at an image sequence frequency of greater than 24 Hz, and
   the image sequence including at least one reference image inserted into the image sequence or replacing an existing image from the image sequence for a uniform lighting of the at least part of the route, so that the reference image is used to provide the uniform lighting for a short moment;
   a vehicle camera, synchronized to the at least one reference image, to capture camera data of the at least part of the route lit by the pixel lamp; and
   a controller configured to:
      evaluate the camera data to determine an image of at least one first advisory route accoutrement and information data associated with the image of the at least one first advisory route accoutrement, with reference to the at least one reference image,
      perform a comparison of the information data associated with the image of the at least one first advisory route accoutrement with data of a database,
      determine a control signal of the control signals to provide an image of at least one second advisory route accoutrement in the image sequence by use of the pixel lamp, based on the comparison, and
      provide the control signal to control the pixel lamp to light the at least part of the route based on the image of the at least one second advisory route accoutrement.

* * * * *

UNITED STATES PATENT AND TRADEMARK OFFICE
CERTIFICATE OF CORRECTION

| | | |
|---|---|---|
| PATENT NO. | : 11,932,163 B2 | Page 1 of 1 |
| APPLICATION NO. | : 16/628230 | |
| DATED | : March 19, 2024 | |
| INVENTOR(S) | : Johannes Neukam | |

It is certified that error appears in the above-identified patent and that said Letters Patent is hereby corrected as shown below:

In the Claims

Column 16, Line 12:
In Claim 8, delete "according" and insert --according to--.

Column 16, Line 59:
In Claim 10, delete "according" and insert --according to--.

Column 16, Line 63:
In Claim 11, delete "according" and insert --according to--.

Column 17, Line 3:
In Claim 12, delete "according" and insert --according to--.

Column 17, Line 11:
In Claim 13, delete "according" and insert --according to--.

Column 17, Line 18:
In Claim 14, delete "according" and insert --according to--.

Column 17, Line 22:
In Claim 14, delete "in in" and insert --in--.

Signed and Sealed this
Twenty-fourth Day of December, 2024

Derrick Brent
*Acting Director of the United States Patent and Trademark Office*